May 3, 1949. H. J. HAGEMEYER, JR 2,469,110
PROCESS FOR PREPARING B-LACTONES
Filed April 6, 1946
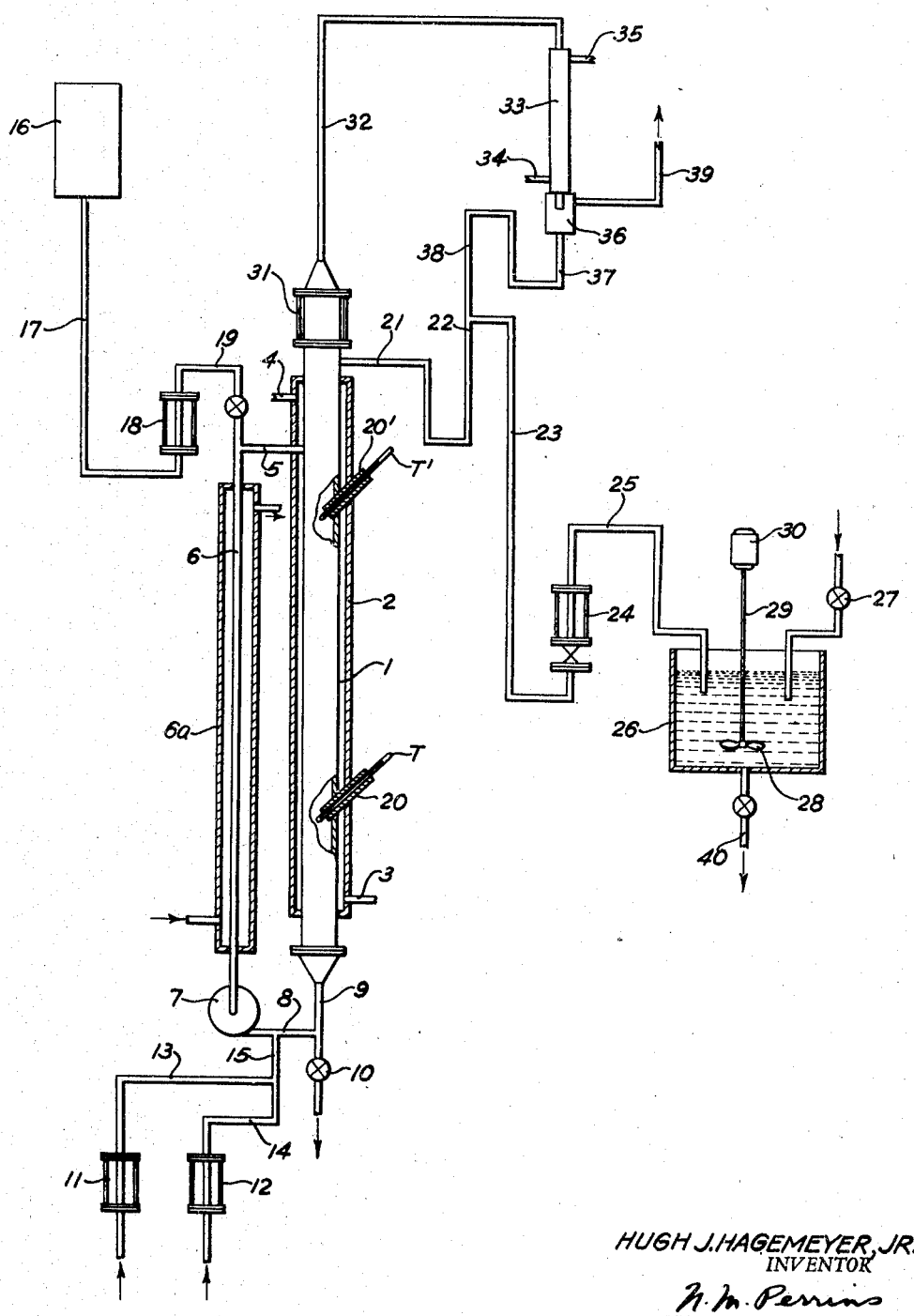
HUGH J. HAGEMEYER, JR.
INVENTOR
BY N. M. Perrins
Daniel S. Mayne
ATTORNEYS Patented May 3, 1949

2,469,110

UNITED STATES PATENT OFFICE 2,469,110

PROCESS FOR PREPARING β-LACTONES

Hugh J. Hagemeyer, Jr., Kingsport, Tenn., assignor to Eastman Kodak Company, Rochester, N. Y., a corporation of New Jersey Application April 6, 1946, Serial No. 660,287

13 Claims. (Cl. 260—344)

This invention relates to a process for preparing β-lactones, i. e. lactones of β-hydroxy carboxylic acids, from ketenes and aldehydes, ketones, diketones and keto carboxylic esters.

Staudinger first showed that a keto ketene, such as diphenyl ketene, added to aldehydes or ketones to give β-lactones. Ann. 384, 38–135 (1911), and Ann. 380, 243 (1911). Staudinger also showed the addition of diphenyl ketene to unsaturated ketones, and isolated diolefins from the reaction mixture. Ann. 401, 263 (1913).

Aldo ketenes, on the other hand, are relatively unstable as compared with keto ketenes and dimerize rapidly, under ordinary conditions of temperature and pressure. In the absence of a catalyst, aldo ketenes do not condense with carbonyl compounds, but form the dimer instead. With aldehydes, the ketene dimers react to form unsaturated ketones. See Boese, United States Patent 2,108,427, dated February 15, 1938.

Kung in United States Patent 2,356,459, dated August 22, 1944, has shown that ketene ($CH_2=C=O$) reacts with aldehydes or ketones to give β-lactones, in the presence of Friedel-Crafts type of catalysts.

I have now found that, in the presence of boric acid, an ester of boric acid and an alcohol, or an acylated boric acid, ketenes (both aldo and keto ketenes) react with carbonyl compounds selected from the group consisting of aldehydes, ketones, diketones and keto carboxylic esters to give β-lactones, even though ketene and ketones react in the presence of sulfuric acid, phosphoric acid, etc., to give enol acetates. See Gwynn and Degering U. S. Patent 2,383,965, dated September 4, 1945.

The catalysts of my process are superior to the Friedel-Crafts type of catalyst, in that separation of the β-lactone from the reaction mixture may be accomplished in the presence of the catalyst. This is important because of the instability of the β-lactones, which in the case of the Friedel-Crafts type of catalyst necessitates the removal or neutralization of the catalyst before separation of the β-lactone from the reaction mixture can be accomplished.

It is, accordingly, an object of my invention to provide an improved process for preparing β-lactones. Other objects will become apparent hereinafter.

In accordance with my invention, I prepare β-lactones by reacting a ketene (either an aldo ketene or a keto ketene) with an aldehyde, a ketone, a diketone, or a keto carboxylic ester, in the presence of boric acid, an ester of boric acid and an alcohol, or an acylated boric acid.

The ketenes which are advantageously employed in practicing my invention can be represented by the following general formula:

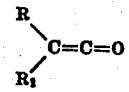

wherein R and $R_1$ each represents a hydrogen atom, an alkyl group (i. e. especially methyl and ethyl groups, i. e. alkyl groups of the formula $C_nH_{2n+1}$ wherein $n$ represents a positive integer of from 1 to 2) or an aryl group (especially a phenyl group, i. e. a $C_6H_5$-group). Although my invention is directed primarily to a process involving ketene ($CH_2=C=O$), any aldo ketene or any keto ketene can be employed. Typical aldo ketenes include ketene, methyl ketene, ethyl ketene, etc. Typical keto ketenes include dimethyl ketene, diethyl ketene, diphenyl ketene, methyl phenyl ketene, etc.

The aldehydes which are advantageously employed in practicing my invention can be represented by the following general formula:

wherein $R_2$ represents hydrogen, an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aralkyl group (especially benzyl or β-phenylethyl), and an aryl group (especially a monocyclic aryl group of the benzene series, e. g. phenyl, m-tolyl and p-tolyl). My new process is especially useful for the preparation of β-lactones from aldehydes of the above general formula wherein $R_2$ represents a hydrogen atom or a methyl group.

The ketones which are advantageously employed in practicing my invention can be represented by the following general formula:

wherein $R_3$ represents an alkyl group (especially methyl, ethyl, isopropyl, n-propyl, n-butyl, isobutyl, secondary butyl and tertiary butyl groups, i. e. an alkyl group of the formula $C_nH_{2n+1}$ wherein $n$ represents a positive integer of from 1 to 4), an aryl group (especially a monocyclic aryl group of the benzene series, e. g. phenyl, m-tolyl and p-tolyl), or an aralkyl group (especially benzyl and β-phenylethyl), and R4 represents an alkyl group (especially methyl and ethyl groups) an aryl group (especially a monocyclic aryl group of the benzene series, e. g. phenyl, m-tolyl and p-tolyl) or an aralkyl group (especially benzyl and β-phenylethyl). My new process is especially useful for the preparation of β-lactones from the above-formulated ketones wherein R4 represents a methyl group.

The diketones which are advantageously employed in practicing my invention can be represented by the following general formula:

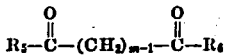

wherein $R_5$ and $R_6$ each represents an alkyl group (especially a methyl, an ethyl or a n-propyl group) and $m$ represents a positive integer of from 1 to 3.

The keto carboxylic esters which are advantageously employed in practicing my invention can be represented by the following general formula:

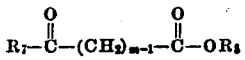

wherein $R_7$ represents an alkyl group (especially methyl and ethyl groups), $R_8$ represents an alkyl group (especially methyl, ethyl, isopropyl, n-propyl, n-butyl, isobutyl and secondary butyl groups) and $m$ represents a positive integer of from 1 to 3.

Typical of the aldehydes, ketones, diketones and keto carboxylic esters are: formaldehyde, acetaldehyde, propionaldehyde, n-butyraldehyde, isobutyraldehyde, phenylacetaldehyde, benzaldehyde, p-methylbenzaldehyde, crotonaldehyde, furfuraldehyde, acetone, ethyl methyl ketone, methyl n-propyl ketone, methyl isopropyl ketone, methyl n-butyl ketone, methyl isobutyl ketone, diethyl ketone, methyl isopropenyl ketone, acetophenone, methyl benzyl ketone, p-methylacetophenone, diacetyl, dipropionyl, di-n-butyryl, diisobutyryl, acetyl acetone, hexanedione-2,4, methyl pyruvate, ethyl pyruvate, methyl acetoacetate, ethyl acetoacetate, n-propyl acetoacetate, n-butyl acetoacetate, ethyl levulinate, etc.

The catalysts which are advantageously employed in practicing my invention can be represented by the following general formula:

wherein $R_9$ represents a hydrogen atom, an alcohol radical (especially methyl, ethyl, n-propyl, n-butyl, and isobutyl groups, i. e. a primary alkyl group of the formula $C_nH_{2n+1}$ wherein $n$ represents a positive integer of from 1 to 4) and an acyl group (especially an acetyl or propionyl group).

Typical boron compounds formulated above include boric acid, trimethyl borate, triethyl borate, tri-n-propyl borate, tri-n-butyl borate, triacetyl boric acid and tripropionyl boric acid. Acylated boric acids are formed upon bringing boric acid into contact with a ketene. Boric acid is advantageously employed as the catalyst.

The quantity of catalyst employed can be varied and optimum concentrations are usually a function of the reactants employed. Ordinarily a concentration of catalyst equal to from about 0.1 to about 3% by weight of the total (all reactants plus solvent, if any) reaction mixture is advantageously employed. Higher concentrations of catalyst can be used, although ordinarily there is no advantage in doing so.

Where the carbonyl compound employed is an aldehyde, it is advantageous ordinarily to add the ketene and the aldehyde simultaneously and in equimolecular proportions to the catalyst or to a medium containing the catalyst. Where the carbonyl compound employed is a ketone, diketone or a keto carboxylic ester, the ketene is ordinarily advantageously added to the ketone or keto carboxylic ester containing the catalyst.

Advantageously my new process is carried out in a solvent for the reactants, i. e. an organic liquid which dissolves both the ketene and the aldehyde, ketone, diketone or keto carboxylic ester, and which is relatively inert to the reactants. Suitable solvents include the dialkyl ethers which are liquid at 10° C., e. g. diethyl ether, ethyl isopropyl ether, diisopropyl ether, ethyl n-butyl ether, methyl n-propyl ether, etc., cyclic ethers which are liquid at 10° C., e. g. 1,4-dioxane, chlorinated hydrocarbons which are liquid at 10° C., e. g. chloroform, carbon tetrachloride, ethylidene dichloride, ethylene dichloride, etc., hydrocarbons which are liquid at 10° C., e. g. benzene, toluene, etc.

In the case of the lower aldehydes, such as formaldehyde and acetaldehyde, ketones which are liquid at 10° C. can be employed as solvents because formaldehyde and acetaldehyde react with the ketenes much faster than do the ketones to give β-lactones in accordance with my process. Acetone and methyl ethyl ketone are advantageously employed as solvents when formaldehyde or acetaldehyde is employed.

The β-lactones, themselves, are excellent solvents in which to carry out my new process and are the preferred solvents.

The process of my invention is advantageously carried out at temperatures below 50° C. Ordinarily temperatures between about 10 and about 20° C. are preferred, although temperatures as low as —50° C. can be employed.

The process of my invention can be carried out batchwise or continuously (e. g. in the continuous manner described in the copending application of Hugh J. Hagemeyer, Jr., and Delmer C. Cooper, Serial No. 660,286, filed of even date herewith). Where ketene ($CH_2=C=O$) is prepared by the catalytic pyrolysis of acetic acid at reduced pressures, it is advantageous to carry out the process at reduced pressure in a scrubber-type reactor, e. g. ketene and formaldehyde can be reacted at reduced pressure in a scrubber-type reactor (in the manner described in the copending application of Herbert G. Stone, Serial No. 660,285, filed of even date herewith), using β-propionolactone as a solvent and boric acid as a catalyst.

Many of the β-lactones can be distilled from the reaction mixtures under reduced pressures. However, many of the β-lactones derived from aldehydes and ketones containing olefinic or acetylenic bonds (e. g. crotonaldehyde, methyl isopropenyl ketone, furfuraldehyde, etc.) and many of the β-lactones derived from keto carboxylic esters and diketones cannot be distilled, even under reduced pressure, without undergoing decarboxylation, i. e. loss of carbon dioxide, to give unsaturated compounds. Even the lower molecular weight β-lactones derived from lower molecular weight aldehydes and ketones, e. g. formaldehyde, acetaldehyde, acetone and ethyl methyl ketone, have a tendency to polymerize when heated. With these lower molecular weight β-lactones, it is advantageous to flash distill (i. e. distill rapidly under a low vacuum, the pump producing the vacuum having a capacity greater than the volume of vapor in the still) the reaction mixture and then to purify further the β-lactone by fractional redistillation under reduced pressure.

The accompanying drawing illustrates, schematically, apparatus suitable for carrying out my invention in one of its embodiments. The operation of this apparatus is described in Hagemeyer and Cooper application Serial No. 660,286, filed of even date herewith. The drawing shows a reactor 1 which can be in the form of a stainless steel cylindrical tube 8 feet in height and having an inside diameter of 2 inches, and which is provided with a cooling jacket 2 through which can be circulated an appropriate cooling medium, such as cold water, brine, glycol, or the like, the medium being introduced into the jacket 2 via inlet 3 and being withdrawn therefrom via outlet 4.

Reactor 1 forms part of a cyclic system made up of the reactor, conduit 5, return conduit 6, pump 7, and conduits 8 and 9, all connected as shown so as to provide a continuous path or cycle through which the reaction mixture is circulated by means of pump 7. Return conduit 6 is provided with appropriate cooling means adapted to maintain the temperature of the liquid being returned to pump 7 at approximately the same value as that of the liquid in reactor 1. Such cooling means may take the form of a jacket 6a through which a cooling medium may be circulated as indicated by the arrows.

A drain valve 10 is provided in conduit 9 below its junction with conduit 8 to provide appropriate means for removing material from the reactor or the cyclic system, as may be desired.

Means are provided for introducing reactants, such as ketene and formaldehyde, into the system through rotameters 11 and 12, respectively, the latter of which may be provided with an appropriate jacket supplied with a heat exchange medium maintained at a temperature sufficient to keep the formaldehyde in the vapor phase. Upon leaving the respective rotameters, the reactants are conveyed through conduits 13 and 14, respectively, thereafter meeting in conduit 15 which conveys them immediately into conduit 8 where they meet and mix with the stream of liquid circulated by pump 7.

Numeral 16 designates a storage tank for supplying to the cyclic system an appropriate catalyst solution, such as a 2.5 per cent by weight solution of boric acid in acetone, the solution being continuously fed through conduit 17, rotameter 18 and valved conduit 19 and thence into the circulating stream of liquid at the junction of conduits 5 and 6, at such a rate as to maintain in the body of the solution in reactor 1 a constant catalyst concentration, for example, of 0.3 per cent.

Reactor 1 is provided with appropriate wells 20 and 20' through which are inserted thermometers T and T' for measuring the temperature of the mixture within the reactor 2.

The top of reactor 1 is connected through sight glass 31, a suitable coupling, and through conduit 32, with condenser 33, the latter being supplied with appropriate cooling liquid through inlet 34 and outlet 35. In the event some of the beta-lactone solution is mechanically carried out of reactor 1 by the incondensable gases in the ketene stream, it is condensed out in condenser 33. The condensed beta-lactone is separated from the gaseous material in separator 36, the condensate being returned through liquid seal 37 and conduit 38 into the overflow line 23. The incondensable gases find their way out of the system through vent pipe 39.

Reactor 1 is provided with an outlet conduit 21, through which the reaction liquid containing the beta-lactone is withdrawn. Conduit 21 is equipped with a liquid seal 22, the material obtained from reactor 1 finding its way through conduit 21 through liquid seal 22 and thence through conduit 23. The liquid obtained from conduit 23 can be passed to an ordinary fractionation column (not shown) where the low-boiling components, such as acetone, are removed, thus leaving the crude beta-lactone as a residue, which can be further purified by flash distillation, if desired. Alternatively, the material from conduit 23 can be passed through rotameter 24 and conduit 25 to neutralizing tank 26 where provision is made for neutralization with caustic introduced as desired through valved conduit 27. Provision is made for agitation of the mixture undergoing neutralization through a rotary stirrer 28 mounted on shaft 29 and driven by motor 30. Provision is also made for removing the neutralized liquid from tank 26 by means of valved conduit 40, from whence it is passed to the fractionation column (not shown) provided for removing low-boiling solvents which are removed prior to flash distillation of the crude beta-lactone. It is to be understood that the neutralization step can be omitted entirely in operating the process of my invention, since an important advantage in the use of the present catalysts is that the reaction mixture can be distilled in their presence, without neutralization, to give the desired beta-lactone directly. The process of condensing ketenes with carbonyl compounds to form beta-lactones wherein the above apparatus is utilized is illustrated in some of the following examples.

The following examples will serve to illustrate further the manner of practicing my invention:

*Example 1—Lactone of β-hydroxypropionic acid (β-propionolactone)*

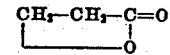

A stainless steel jacketed reactor, 8 feet high and 2 inches inside diameter, exactly like the reactor described in the copending application of Hugh J. Hagemeyer and Delmer C. Cooper, supra, was charged with acetone dissolved in which was 100 g. of boric acid. The acetone solution was circulated through the reactor from bottom to top and thence to the bottom through a return line by means of a pump situated in the return line, at a rate of 2 gallons per minute, and the solution was cooled to 10° C. by means of cold water circulated through the jacket of the reactor. 7 g. of ketene per minute and 5 g. of formaldehyde per minute were measured through metering devices and intimately mixed and then immediately introduced into the circulating stream of acetone solution in the return line on the discharge side of the pump. As the volume of liquid in the reactor increased, the liquid in the reactor overflowed at the top, through a liquid-seal overflow, into a line where the liquid passed to a still and the vapors, after passing through a condenser, were returned to the reactor. In a 24-hour run in this continuous manner, 10,080 g. of ketene and 7,240 g. of formaldehyde entered the reactor. During the run 100 g. of boric acid dissolved in about 5 liters of acetone were introduced gradually into the reactor. At the end of the 24-hour run, the liquid in the still was heated carefully to remove the greater part of the acetone and the residue was distilled under reduced pressure. A 72% yield of β-propionolactone boiling at 82 to 83° C. at 100 mm. of Hg pressure was obtained. The refractive index (20/D) of the β-propionolactone was 1.4129.

*Example 2.—Lactone of β-hydroxybutyric acid (β-butyrolactone)*

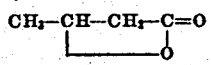

5 g. of boric acid were added to 250 ml. of acetone. The resulting solution was cooled to 10° C. and ketene generated by the pyrolysis of acetone, was introduced into the solution through a hollow high speed stirrer. Acetaldehyde (in an amount molecularly equivalent to the ketene) was simultaneously introduced into the solution. After four gram-moles of the ketene and four gram-moles of the acetaldehyde had been introduced over a period of 8 hours, the reaction mixture was distilled on a steam bath to remove the acetone and the residue was distilled at 10 mm. of Hg pressure. A 64% yield of β-butyrolactone (the lactone of β-hydroxybutyric acid), boiling at 54° C. at 10 mm. of Hg pressure, was obtained.

*Example 3.—Lactone of β-hydroxybutyric acid (β-butyrolactone)*

5 g. of triethyl borate were added to 250 ml. of acetone. The resulting solution was cooled to 10° C. and 4 gram-moles of ketene and 4 gram-moles of acetaldehyde were added simultaneously to the boric ester solution over a period of eight hours. The reaction mixture was then heated carefully to remove the greater part of the acetone and the residue was distilled under reduced pressure. A 49% yield of β-butyrolactone boiling at 54° C. at 10 mm. of Hg was obtained.

*Example 4.—Lactone of β-hydroxy-β-methylbutyric acid (β-methyl-β-butyrolactone)*

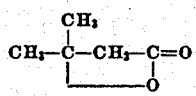

5 cc. of triethylborate were dissolved in 300 cc. of acetone and the solution was cooled in an ice bath to 10° C. Ketene ($CH_2=C=O$) was passed into the cool solution at a rate of 0.46 gram-mole per hour. After 8 hours, the volume of the reaction mixture increased to 420 cc. The reaction mixture was then distilled under reduced pressure. 82 grams of β-methyl-β-butyrolactone, boiling at 55° C. at 10 mm. of Hg pressure, were obtained.

*Example 5.—Lactone of β-carbethoxymethyl-β-hydroxybutyric acid*

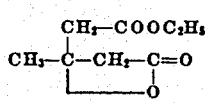

200 g. of acetoacetic ester (ethyl acetoacetate) and 2 g. of boric acid were stirred and cooled to 0 to 10° C. 8 gram-moles of ketene were added to the acetoacetic ester through a hollow high speed stirrer, at a rate of about 2 gram-moles per hour. The resulting reaction mixture consisted essentially of the above-formulated lactone of β-carbethoxy-β-hydroxybutyric acid which can be distilled; even under reduced pressure, only with considerable decarboxylation.

The reaction mixture was then refluxed at atmospheric pressure until decarboxylation was substantially complete, i. e. until substantially no more carbon dioxide was evolved. The residue was then distilled under reduced pressure, and 125 grams of the ethyl ester of 3-methyl-2-butenoic acid were obtained, boiling at 54 to 55° C. at 20 mm. of Hg pressure. $n_D^{20}$ 1.4410

$D_2^{20}$ 1.0156

*Example 6.—Lactone of β-(2-furyl)-β-hydroxypropionic acid*

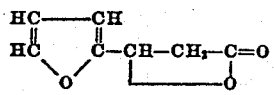

10 g. of boric acid were added to 1595 g. of furfuraldehyde. The mixture was cooled to 0 to 10° C. and ketene ($CH_2=C=O$) was passed into the mixture at a rate of about 2 gram-moles per hour, until an increase in weight of the mixture of 477 g. was obtained. The resulting mixture (consisting essentially of the above-formulated lactone) was allowed to warm up to room temperature (about 25° C.). At room temperature a gradual evolution of carbon dioxide occurred. Distillation of the reaction mixture at atmospheric pressure gave 282 g. of a liquid boiling at 96 to 99° C. Upon redistillation of this liquid, 206 g. of 2-vinylfuran, boiling at 97 to 98° C. at 735 mm. of Hg were obtained.

*Example 7.—Lactone of 2-hydroxy-4-hexenoic acid*

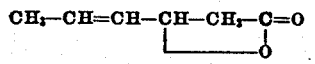

4 gram-moles of ketene were passed into 300 cc. of anhydrous crotonaldehyde containing 2 g. of boric acid while cooling the crotonaldehyde at 0 to 10° C., over a period of about 2 hours. The reaction mixture consisted essentially of the above-formulated lactone and decarboxylates, i. e. loses carbon dioxide rapidly, upon distillation even at reduced pressure.

The reaction mixture was distilled at atmospheric pressure and 96 cc. of material boiling at 35 to 100° C. were obtained. Upon redistillation of this material through a highly efficient fractionating column, 10 g. of piperylene boiling at 41° C. at 732 mm. of Hg were obtained. $n_D^{20}$ 1.4293.

*Example 8.—Lactone of β-hydroxypropionic acid (β-propionolactone)*

5 cc. of triethylborate (triethoxyboron) were added to 2 liters of acetone. 226 g. of ketene ($CH_2=C=O$) and 180 g. of formaldehyde were simultaneously passed into the acetone mixture which was cooled to 10° C., over a period of 4 hours. The resulting mixture was then distilled under reduced pressure and 134 g. of β-propionolactone, boiling at 82 to 83° C. at 100 mm. of Hg pressure, were obtained.

*Example 9.—Lactone of β-hydroxybutyric acid (β-butyrolactone)*

2 g. (2 cc.) of triethylborate were added to 200 cc. of acetone and the mixture was cooled to 5 to 6° C. Into the cooled mixture were simultaneously passed 2 gram-moles of ketene ($CH_2=C=O$)

and 3 gram-moles of acetaldehyde over a period of 8 hours. The resulting mixture was then distilled under reduced pressure and 42 g. of β-butyrolactone, boiling at 54° C. at 10 mm. of Hg pressure, were obtained.

Operating in the same manner, but using 2 cc. of tri-n-butylborate instead of 2 g. of triethylborate, 18 g. of β-butyrolactone were obtained.

*Example 10.—Lactone of β-acetylmethyl-β-hydroxypropionic acid*

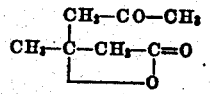

5 g. of triacetyl borate were added to 250 cc. of acetyl acetone and the mixture was cooled to 5 to 10° C. Into the cooled mixture was passed 2 gram-moles of ketene ($CH_2=C=O$) over a period of 8 hours. The reaction mixture consisted essentially of the above formulated lactone and decarboxylates, i. e. loses carbon dioxide rapidly, upon distillation even at reduced pressure.

The reaction mixture was refluxed at atmospheric pressure until decarboxylation was complete. Upon distillation of this material through a highly efficient column, 17 grams of 2-methyl pentene-1-one-4, were obtained B. P.$_{735}$ 127° C., $n_D^{20}$ 1.4412.

In the manner illustrated in the foregoing examples, still other β-lactones can be made. Thus, in Example 4, if four gram-moles of propionaldehyde are employed instead of 300 cc. of acetone, β-valerolactone of the formula:

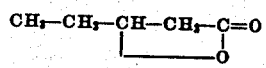

can be produced; four gram-moles of n-butyraldehyde gives β-caprolactone of the formula:

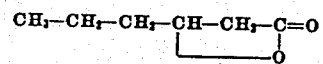

four gram-moles of isobutyraldehyde gives β-isocaprolactone of the formula:

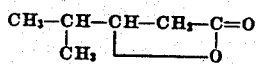

four gram-moles of methyl ethyl ketone gives the lactone of β-hydroxy-β-methyl-n-valeric acid of the formula:

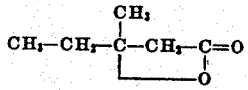

four gram-moles of acetophenone gives the lactone of β-hydroxy-β-phenylpropionic acid of the formula:

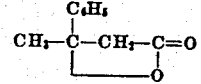

etc.

What I claim as my invention and desire to be secured by Letters Patent of the United States is:

1. A process for preparing a β-lactone comprising reacting, at a temperature of below 50° C. and not less than −50° C. a ketene selected from the ketenes represented by the following general formula:

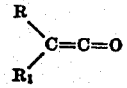

wherein R and $R_1$ each represents a member selected from the group consisting of a hydrogen atom, a methyl group, an ethyl group and a -phenyl ($C_6H_5-$) group, with a carbonyl compound selected from the group represented by the following four general formulas:

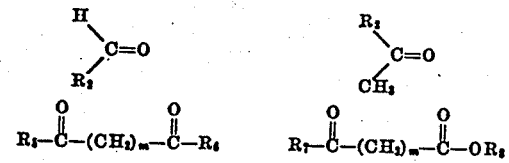

wherein $R_2$ represents a member selected from the group consisting of a hydrogen atom, an alkyl group of the formula $C_nH_{2n+1}$ wherein $n$ represents a positive integer of from 1 to 4, a benzyl group, a β-phenylethyl group and a phenyl ($C_6H_5-$) group, $R_3$ represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4, and $m$ represents a positive integer of from 1 to 3, in the presence of a boron compound selected from the group represented by the following general formula:

wherein $R_9$ represents a member selected from the group consisting of a hydrogen atom, a primary alkyl group of the formula $C_nH_{2n+1}$ wherein $n$ represents a positive integer of from 1 to 4, an acetyl group and a propionyl group.

2. A process for preparing a β-lactone comprising reacting, at a temperature of below 50° C. and not less than −50° C. ketene ($CH_2=C=O$) with a carbonyl compound selected from the group represented by the following four general formulas:

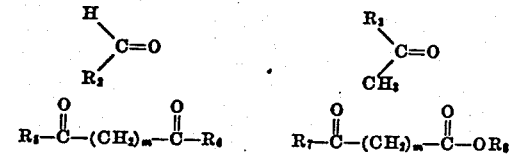

wherein $R_2$ represents a member selected from the group consisting of a hydrogen atom, an alkyl group of the formula $C_nH_{2n+1}$ wherein $n$ represents a positive integer of from 1 to 4, a benzyl group, a β-phenylethyl group and a phenyl ($C_6H_5-$) group, $R_3$ represents a member selected from the group consisting of an alkyl group of the formula $C_nH_{2n+1}$ wherein $n$ represents a positive integer of from 1 to 4, $R_5$ and $R_6$ each represents an alkyl group of the formula $C_nH_{2n+1}$ wherein $n$ represents a positive integer of from 1 to 3, $R_7$ represents an alkyl group selected from the group consisting of methyl and ethyl groups, and $R_8$ represents a member selected from the group consisting of primary and secondary alkyl groups of the formula $C_nH_{2n+1}$ wherein $n$ represents a positive integer of from 1 to 4, and $m$ represents a positive integer of from 1 to 3, in the presence of a boron compound selected from the group represented by the following general formula:

wherein R₉ represents a member selected from the group consisting of a hydrogen atom, a primary alkyl group of the formula C$_n$H$_{2n+1}$ wherein $n$ represents a positive integer of from 1 to 4, an acetyl group and a propionyl group.

3. A process for preparing a β-lactone comprising reacting ketene (CH₂=C=O) with a carbonyl compound selected from the group represented by the following four general formulas:

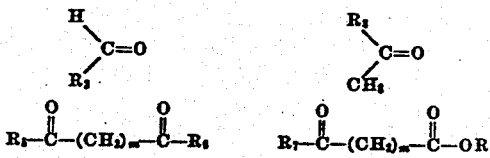

wherein R₂ represents a member selected from the group consisting of a hydrogen atom, an alkyl group of the formula C$_n$H$_{2n+1}$ wherein $n$ represents a positive integer of from 1 to 4, a benzyl group, a β-phenylethyl group and a phenyl (C₆H₅—) group, R₃ represents a member selected from the group consisting of an alkyl group of the formula C$_n$H$_{2n+1}$ wherein $n$ represents a positive integer of from 1 to 4, R₅ and R₆ each represents an alkyl group of the formula C$_n$H$_{2n+1}$ wherein $n$ represents a positive integer of from 1 to 3, R₇ represents an alkyl group selected from the group consisting of methyl and ethyl groups, and R₄ represents a member selected from the group consisting of primary and secondary alkyl groups of the formula C$_n$H$_{2n+1}$ wherein $n$ represents a positive integer of from 1 to 4, and $m$ represents a positive integer of from 1 to 3, in the presence of from about 0.1 to about 3% by weight of the total material in the reaction mixture of a boron compound selected from the group represented by the following general formula:

wherein R₉ represents a member selected from the group consisting of a hydrogen atom, a primary alkyl group of the formula C$_n$H$_{2n+1}$ wherein $n$ represents a positive integer of from 1 to 4, an acetyl group and a propionyl group, at a temperature of from about 10 to about 20° C.

4. A process for preparing β-propionolactone comprising reacting ketene (CH₂=C=O) with formaldehyde, in the presence of from about 0.1 to about 3% by weight of the material in the reaction mixture of a boron compound selected from the group represented by the following general formula:

wherein R₉ represents a member selected from the group consisting of a hydrogen atom, a primary alkyl group of the formula C$_n$H$_{2n+1}$ wherein $n$ represents a positive integer of from 1 to 4, an acetyl group and a propionyl group, at a temperature below 50° C. and not less than —50° C.

5. A process for preparing β-propionolactone comprising reacting ketene (CH₂=C=O) with formaldehyde, in the presence of from about 0.1 to about 3% by weight of the material in the reaction mixture of a boron compound selected from the group represented by the following general formula:

wherein R₉ represents a member selected from the group consisting of a hydrogen atom, a primary alkyl group of the formula C$_n$H$_{2n+1}$ wherein $n$ represents a positive integer of from 1 to 4, an acetyl group and a propionyl group, at a temperature of from about 10° to about 20° C.

6. A process for preparing β-propionolactone comprising reacting ketene (CH₂=C=O) with formaldehyde, in the presence of from about 0.1 to about 3% of the weight of the material in the reaction mixture of boric acid, at a temperature below 50° C. and not less than —50° C.

7. A process for preparing β-propionolactone comprising reacting ketene (CH₂=C=O) with formaldehyde, in the presence of from about 0.1 to about 3% of the weight of the material in the reaction mixture of boric acid, at a temperature of from about 10 to about 20° C.

8. A process for preparing β-propionolactone comprising adding ketene (CH₂=C=O) and formaldehyde in about equimolecular proportions to a solution of a boron compound selected from those represented by the following formula:

wherein R₉ represents a member selected from the group consisting of a hydrogen atom, a primary alkyl group of the formula C$_n$H$_{2n+1}$ wherein $n$ represents a positive integer of from 1 to 4, an acetyl, and a propionyl group, in a solvent selected from the group consisting of acetone, ethyl methyl ketone and β-propionolactone, at a temperature below 50° C. and not less than —50° C., the concentration of the boron compound being equivalent to from about 0.1 to about 3% by weight of the materials in the reaction mixture.

9. A process for preparing β-propionolactone comprising adding ketene (CH₂=C=O) and formaldehyde in about equimolecular proportions to a solution of a boron compound selected from those represented by the following formula:

wherein R₉ represents a member selected from the group consisting of a hydrogen atom, a primary alkyl group of the formula C$_n$H$_{2n+1}$ wherein $n$ represents a positive integer of from 1 to 4, an acetyl, and a propionyl group, in a solvent selected from the group consisting of acetone, ethyl methyl ketone and β-propionolactone, at a temperature of from about 10° to about 20° C., the concentration of the boron compound being equivalent to from about 0.1 to about 3% by weight of the materials in the reaction mixture.

10. A process for preparing β-propionolactone comprising adding ketene (CH₂=C=O) and formaldehyde in about equimolecular proportions to a solution of boric acid in a solvent selected from the group consisting of acetone, ethyl methyl ketone and β-propionolactone, the concentration of the boron compound being equivalent to from about 0.1% to about 3% by weight of the materials in the reaction mixture, at a temperature below 50° C. and not less than —50° C.

11. A process for preparing β-propionolactone comprising adding ketene (CH$_2$=C=O) and formaldehyde in about equimolecular proportions to a solution of boric acid in a solvent selected from the group consisting of acetone, ethyl methyl ketone and β-propionolactone, the concentration of the boron compound being equivalent to from about 0.1% to about 3% by weight of the materials in the reaction mixture, at a temperature of from about 10° to about 20° C.

12. A process for preparing β-butyrolactone comprising adding ketene (CH$_2$=C=O) and acetaldehyde in about equimolecular proportions to a solution of a boron compound selected from those represented by the following formula:

wherein R$_9$ represents a member selected from the group consisting of a hydrogen atom, a primary alkyl group of the formula C$_n$H$_{2n+1}$ wherein $n$ represents a positive integer of from 1 to 4, an acetyl, and a propionyl group, in a solvent selected from the group consisting of acetone, ethyl methyl ketone and β-butyrolactone, at a temperature of from about 10° to about 20° C., the concentration of the boron compound being equivalent to from about 0.1 to about 3% by weight of the materials in the reaction mixture.

13. A process for preparing β-butyrolactone comprising adding ketene (CH$_2$=C=O) and acetaldehyde in about equimolecular proportions to a solution of boric acid in a solvent selected from the group consisting of acetone, ethyl methyl ketone and β-butyrolactone, the concentration of the boron compound being equivalent to from about 0.1% to about 3% by weight of the materials in the reaction mixture, at a temperature of from about 10° to about 20° C.

HUGH J. HAGEMEYER, Jr.

REFERENCES CITED

The following references are of record in the file of this patent:

UNITED STATES PATENTS

| Number | Name | Date |
|---|---|---|
| 2,356,459 | Kung | Aug. 22, 1944 |

OTHER REFERENCES

Chemical Abstracts, 33, 85938 (1939).